United States Patent [19]

Dillon

[11] 4,227,612

[45] Oct. 14, 1980

[54] TWO-PLY RESIN CAPSULE FOR MINING ROOF BOLTING SYSTEMS

[75] Inventor: Robert E. Dillon, Ballston Lake, N.Y.

[73] Assignee: General Electric Company, Gainesville, Fla.

[21] Appl. No.: 50,065

[22] Filed: Jun. 19, 1979

[51] Int. Cl.³ .............................................. B65D 85/68
[52] U.S. Cl. ..................................... 206/219; 53/449; 53/450; 93/94 R; 405/261
[58] Field of Search ............... 405/260, 261, 262, 303; 206/219, 223; 229/51 WB, 66; 53/449, 450, 451, 172, 550, 551, 554, 559; 93/94 R, 36.8

[56] References Cited

U.S. PATENT DOCUMENTS

| 3,156,352 | 11/1964 | Hayhaurst | 206/219 |
|---|---|---|---|
| 3,319,539 | 5/1967 | Johnson et al. | 53/449 X |
| 3,426,499 | 2/1969 | Paige | 53/451 |
| 3,593,483 | 7/1971 | Tracy | 53/551 X |
| 3,661,322 | 5/1972 | Norman | 53/554 X |
| 3,674,134 | 7/1972 | Turner | 206/219 |
| 3,861,522 | 1/1975 | Llewellyn et al. | 229/56 X |
| 3,980,249 | 9/1976 | Cunningham et al. | 93/94 R |
| 3,992,854 | 11/1976 | Howell et al. | 53/551 X |
| 4,009,778 | 3/1977 | Howell | 405/261 X |

Primary Examiner—Dennis L. Taylor

[57] ABSTRACT

A multi-compartment capsule having a longitudinally extending tubular inner compartment for containing a catalyst and a longitudinally extending tubular outer compartment around the inner compartment for containing a resin composition. The container is formed of two-ply film strip material in which at least one ply is of thermoplastic material. The two-ply strip material is made up of two portions overlapped and welded together along a longitudinally extending edge with the thermoplastic material sides facing each other and forming the weld. One edge of the two-ply strip is folded upon itself along one edge to bring the thermoplastic material ply into contact and welded to form the inner compartment. The other strip edge is folded over the inner compartment to bring the thermoplastic material ply of such other edge into contact with the thermoplastic ply and welded to form the longitudinally extending outer compartment.

11 Claims, 2 Drawing Figures

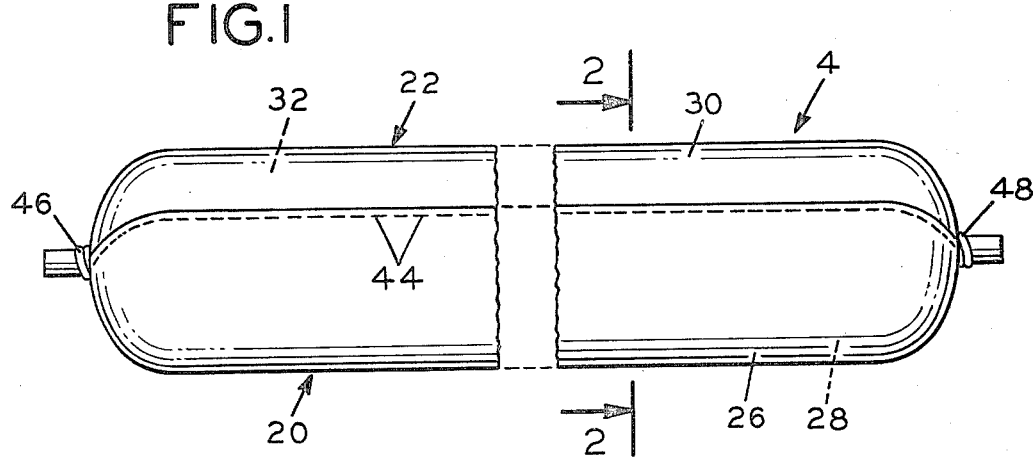
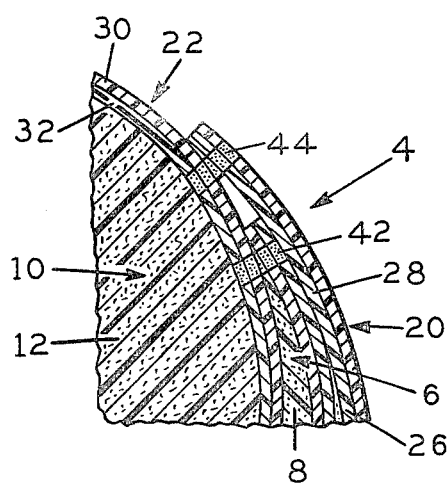
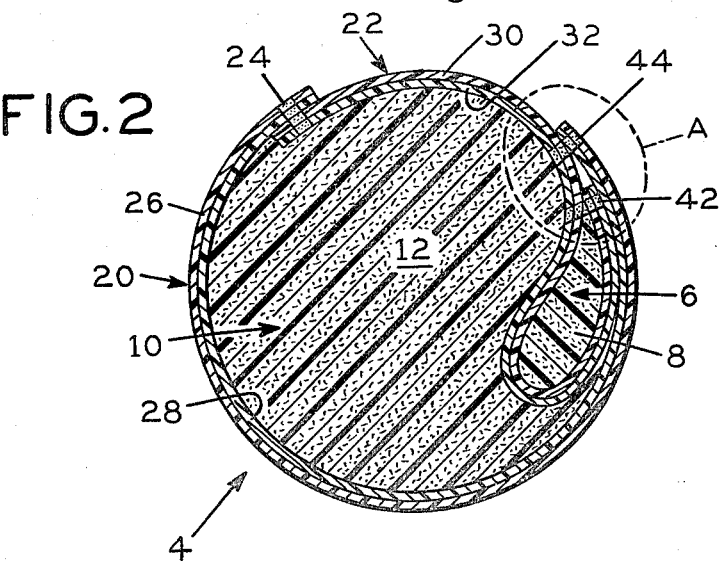

TWO-PLY RESIN CAPSULE FOR MINING ROOF BOLTING SYSTEMS

This invention relates to a multi-compartment capsule and, more specifically, to a multi-compartmented capsule particularly adapted for mining roof bolting systems.

It has become common practice in mining to reinforce or stabilize mine roofs by drilling or boring a hole into the rock strata at the roof of the mine, inserting a resin capsule into the drilled hole and then inserting a specially designed bolt through the capsule into the hole. One compartment in the capsule contains a resin and the other compartment contains a catalyst or hardening agent for the resin. The bolt, as it is inserted, ruptures the capsule and the capsule compartments. The bolt is turned and distributes and mixes the catalyst or hardener with the resin. This causes the resin to cure and harden around the bolt in the drilled or bored hole and in the cracks and voids in the rock structure contiguous thereto. The cured and hardened resin and bolt reinforce and strengthen the mine roof. This is, of course, critical to the safety of the mine and the surface above.

There are a number of resin systems which are useful in mining roof bolting systems. Such resins include epoxies, polyurethanes and polyesters. Typical of useful resins are the so-called unsaturated polyester resins prepared by esterification of a mixture of ingredients including a polyhydric alcohol and an unsaturated polycarboxylic acid combined as desired with cross-linking monomers typified by vinyl monomers, such as, styrene and vinyl toluene, along with various fillers, flow modifiers, thixotropic agents, flame retardant materials, plasticizers and initiators or curing agents which are typically of the well known peroxide type.

A typical resin useful in connection with mining roof bolting systems and for which the container of the instant invention is suited consists of a 65-35 by weight mixture of fumaric acid and phthalic anhydride, esterified with propylene glycol and cut to 70 percent polyester by weight with a 50—50 by weight blend of styrene and vinyl toluene. There is added to this basic resin mixture a cure accelerator and filler such as limestone, dolomite or other mineral filler to the extent of about 73 percent by weight. These parameters can be varied to suit particular conditions. Typically, the curing or hardening agent comprises benzoyl peroxide used in suitable curing quantities and is kept separated from the basic mixture until reaction, setting and hardening is desired.

The handling, packaging and storing of the resin mixture and the curing or hardening agent, the handling of the packaged unit, the introduction of the packaged resin mixture and curing or hardening agent into a drilled or bored hole in a mine roof and the blending and mixing of the resin and curing agent in the hole when the bolt is inserted, present interesting problems. On the one hand, the resin mixture and the curing and hardening agent must be packaged so that they will withstand handling and extended periods of storage without deterioration or reaction with each other or deterioration or reaction from the atmosphere. On the other hand, such mixture and agent must also be packaged so that, when in place in a drilled or bored mining roof hole, the roof bolt has been inserted and the bolt turned, the package and packaging materials will not inhibit or interfere with the mixing, blending and curing or hardening of the resin. Furthermore, the packaging material and packaging configuration must be such that the package is inexpensive to provide, easy to fill, will occupy minimum of space within the roof hole and will not interfere with the reaction of the resin with the agent or the hardening of the resin around the bolt in the hold and in the rock cracks and voids contiguous thereto.

One method and apparatus found to be particularly suited for inexpensive packaging of resin and a curing and hardening agent for use in mining roof bolting systems is shown and described in U.S. Pat. No. 4,009,778, dated Mar. 1, 1977. In the arrangement of such patent, a strip of thermoplastic sheet material is shaped into a tube, having a smaller tube therein, by folding and rolling one longitudinal edge of the strip into a longitudinally extending smaller tube and by then rolling the other longitudinal edge over the fold and the one longitudinal edge to form a larger tube around the small tube. The longitudinal edges and the sheet along the line where the one longitudinal edge is folded or rolled back are then heat sealed to form a continuous, two compartment tube. The smaller diameter inner tube is filled with the catalyst or hardening agent and the larger, outer tube is filled with the resin just after the edges and sheet are heat sealed. The filled container is then formed into units or capsules, by gathering and cutting the ends at fixed lengths with clips or wires. An apparatus similar to the apparatus of the '778 patent but employing an ultra-sonic unit for sealing is shown and described in U.S. patent application Ser. No. 040,217, filed May 18, 1979.

One material which has been found to be particularly suited for use in forming two compartment capsules of the type formed by the apparatus of the '778 patent is polyester film, such as, polyethylene terephthalate film, or Mylar. Such film is impervious to vapor and, therefore, is ideal for maintaining the freshness of the resin and the catalyst or hardening agent. Leakage of vapor from the atmosphere into the capsule and out of the capsule into the atmosphere is reduced. Such film material is also inert to the resin and the catalyst.

One of the difficulties with polyester film, such as Mylar, when used in a heat sealed capsule is the difficulty in attaining an acceptable seal. Such film material is highly crystalline and is critically temperature responsive. Unlike other polymeric materials, such as polyethylene, which soften and become tacky over a temperature range, polyester film materials tend to be soft and tacky in a very narrow and limited temperature range. Below such temperature the material is neither sticky nor heat sealable. Above such temperature, the material melts. Because of the difficulty in exact controlling of temperature in a production facility, such as in the apparatus of the '778 patent, it has been the practice, heretofore, to coat the polyester film for use in such apparatus with a thermoplastic material, such as polyethylene. This has been accomplished by laminating polyester film with polyethylene film and by heat sealing the capsule by lapping and fusing the polyethylene film surface of the laminate. Because of the folding and the rolling of the film strip in the forming of the two compartment longitudinal capsule it has, heretofore, been necessary to laminate both sides of the polyester film with polyethylene film. This has been done so that, when overlapped, a polyethylene surface will contact a polyethylene surface for heat sealing.

In addition to facilitating heat sealing, the laminated polyethylene-polyester has improved properties not found in either material alone. The polyester film of the laminate tends to limit the stretch of the polyethylene film. Conversely, the polyethylene film of the laminate tends to off-set the brittleness of the polyester film.

The laminating of the polyester film on its opposite sides with polyethylene film or other film having similar heat seal characteristics is expensive and adds to the cost of the capsule. Except for the heat seal which it provides, the lamination of the polyethylene film on the two sides of the polyester film provides little more than a laminate on one side and is more costly.

In the instant invention it has been discovered that the cost of mining roof bolting systems capsules can be significantly reduced without the sacrifice of heat sealing ability and, at the same time, the rigidity of the capsule can be increased. With increased rigidity the capsule is easier to handle and to insert into the drilled or bored mining roof hole. Such reduction in cost and increased rigidity as accomplished in the present invention with a two-ply, rather than a three-ply, film strip. Such two-ply film strip is readily available commercially and does not require special fabrication.

In the practice of the invention, two strips of two-ply material, one ply, for example, being of polyester film and the other ply of polyethylene film, are overlapped along one longitudinal edge with the plies of like materials, for example, polyethylene, in face to face contact. Thus, with the two strips laid out on a flat surface and the edges overlapped, the polyester surface of one strip and the polyethylene surface of the other strip would face upwardly. Preferably, for ease in heat sealing, the polyethylene surface of the two strips would be in face to face contact in the area of overlap. The two strips are heat sealed and joined to each other along the area of overlap. The joined strips, which now, for practical purposes, are a single strip, are folded along one edge, the other edge is rolled and inner and outer tubes are formed, heat sealed and filled with the resin and the catalyst in conventional manner.

The invention of the present application will be better understood from the following description, taken with the appended drawings, of the preferred embodiment of the instant invention in which FIG. 1 is a side elevation view of the multi-compartment capsule of the invention;

FIG. 2 is a section taken at 2, 2 FIG. 1; and

FIG. 3 is an enlarged detail of that portion of the capsule indicated at A, FIG. 2.

With reference to the drawings, the capsule, generally designated 4, includes an inner tube 6 filled with a catalyst or hardening agent 8, such as benzoyl peroxide, and an outer tube 10 filled with a resin 12, such as fumaric acid and phthalic anhydride, esterified with propylene glycol and cut with a blend of styrene and vinyl toluene to which a cure accelerator and a mineral filler have been added. The walls of inner tube 6, outer tube 10 and, thus, capsule 4 are made up of two laminated strips, generally designated 20, 22, overlapped and joined by a heat seal or weld 24. Outer ply 26 of laminated strip 20 is of polyester material, such as Mylar. Inner ply 28 of laminated strip 20 is of a thermoplastic material, such as polyethylene. The plies of laminated strip 22 are the reverse of strip 20, that is, the outer ply 30 of strip 22 is of a thermoplastic material, such as polyethylene, and the inner ply 32 is of polyester, such as Mylar. Thus, as best shown in FIGS. 2, inner polyethylene ply 28 of laminated strip 20 is overlapped with and heat sealed or welded at 24 to outer polyethylene ply 30 of laminated strip 22.

Laminated strips 20, 22 may be overlapped, polyethylene plies 28, 30, may be brought together, face to face, and heat sealed or welded together, at 24, in a separate operation or the two laminated strips 20, 22 may be overlapped, brought together and heat sealed or welded as the strip is fed to the apparatus of the '778 patent for forming, heat sealing and filling or to the apparatus of the '217 application for forming, ultra-sonic sealing and filling.

As best shown in FIG. 2 and the enlarged detail of FIG. 3, when folded back upon itself to form inner tube 6, outer polyethylene ply 30 at the edge of strip 22 is folded back upon polyethylene ply 30. As best shown in FIG. 3, heat seal or weld 42 is then formed longitudinally just inwardly of the edge of strip 22 to form inner tube 6. The edge of strip 20 is brought around the sealed end of tube 6 so that the inner polyethylene ply 28 at the edge of strip 20 engages outer polyethylene ply 30 of strip 22. Heat seal or weld 44 is formed longitudinally just inwardly of the edge of strip 20 to form outer tube 10 around inner tube 6. Tubes 10 and 6 are then filled with resin and catalyst or hardener, respectively. The ends of the tubes are collapsed and closed with wire wraps or clips 46, 48 and severed from adjoining capsules outboard of the clips.

The width of strips 20, 22, relative to each other will determine at what point in the capsule periphery the overlapping of the strips and longitudinal heat sealing or welding 24 of the plies will occur. Thus, the strip widths might be proportioned so that heat seals or welds 24, 44 are separated at 180°, 120° or 90° around the capsule periphery from each other or at such other spacing about the periphery to impart a particular stiffness, rigidity or reinforcement to the capsule.

While the two-ply laminated film strips have been described as being formed of a ply of polyester and a ply of polyethylene, it is to be understood that other thermoplastic film material, compatible with the resin and catalyst of the capsule filling might be employed. Furthermore, metal foils, such as aluminum foil or a metallized film might be substituted for the polyester to further reduce vapor transmission.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed:

1. A multi-compartment capsule having a longitudinally extending tubular inner compartment for containing a catalyst and a longitudinally extending tubular outer compartment around said inner compartment for containing a resin composition which, when mixed and reacted with said catalyst sets and becomes a hardened mass, said compartments being fromed by a two-ply film strip having at least one ply of thermoplastic material, said two-ply film strip having a first longitudinally extending portion in which said thermoplastic material is on one side of said strip and a second longitudinally extending portion in which said thermoplastic material is on the opposite side of said strip, said thermoplastic sides of said film strip being overlapped and welded to each other along a longitudinally extending edge, said two-ply strip material being folded back upon itself along an edge spaced from said longitudinally extending welded edge so that the thermoplastic side of said strip at said folded edge is in contact with and welded to the thermoplastic side of said strip and forms said longitudinally extending tubular inner compartment and said opposite edge of said two-ply strip being folded around said tubular inner compartment so that the thermoplastic side of said strip at said opposite edge is in contact with and welded to the thermoplastic side of said strip and forms said longitudinally extending tubular outer compartment.

2. A multi-compartment capsule, as recited in claim 1, in which said opposite edge of said two-ply strip folded around said inner compartment extends circumferentially of said capsule beyond the welded edge of said longitudinally extending tubular inner compartment.

3. A multi-compartment capsule, as recited in claim 1 or 2, in which said thermoplastic material is the outer ply at said edge folded back upon itself and welded to form said inner tubular compartment and is the inner ply at said opposite edge folded around said inner tubular compartment and welded to form said outer tubular compartment.

4. A multi-compartment capsule, as recited in claims 1 or 2 in which said thermoplastic material is polyethylene.

5. A multi-compartment capsule, as recited in claims 1 or 2, in which one ply of said two-ply film strip is polyethylene and the other ply is polyester material.

6. A multi-compartment capsule, as recited in claims 1 or 2, in which one ply of said two-ply film strip is polyethylene and the other is polyethylene terephthalate material.

7. A multi-compartment capsule, as recited in claims 1 or 2 in which said weld at said overlapped and longitudinally extending edge and said weld at said edge folded around said inner tubular compartment and forming said outer compartment are spaced circumferentially around said capsule.

8. A multi-compartment capsule, as recited in claims 1 or 2, in which said weld at said overlapped and longitudinally extending edge and said weld at said edge folded around said inner tubular compartment and forming said outer compartment are spaced a distance not more than 180° and not less than 90° circumferentially around said capsule.

9. A multi-compartment capsule, as recited in claims 1 or 2, in which one ply of said two-ply film strip is polyethylene and the other ply is a metallized film material.

10. A multi-compartment capsule, as recited in claims 1 or 2, in which one ply of said two-ply film strip is polyethylene and the other ply is a metal foil.

11. A multi-compartment capsule, as recited in claims 1, 2, 3, or 4, in which the other ply of said two-ply film strip is polyethylene and the other ply is aluminum foil.

* * * * *

UNITED STATES PATENT AND TRADEMARK OFFICE
CERTIFICATE OF CORRECTION

PATENT NO. : 4,227,612
DATED : October 14, 1980
INVENTOR(S) : Robert E. Dillon

It is certified that error appears in the above—identified patent and that said Letters Patent is hereby corrected as shown below:

In the heading of the patent under [73] Assignee:

Cancel "Gainesville, Florida" and substitute --Schenectady, New York--.

Signed and Sealed this

Fourteenth Day of April 1981

[SEAL]

Attest:

RENE D. TEGTMEYER

Attesting Officer

Acting Commissioner of Patents and Trademarks